US009619704B2

(12) United States Patent
Hasler et al.

(10) Patent No.: US 9,619,704 B2
(45) Date of Patent: Apr. 11, 2017

(54) FAST ARTICULATED MOTION TRACKING

(71) Applicants: Max-Planck Gesellschaft zur Förderung der Wissenschaften e.V., Munich (DE); ETH Eidgenössische Technische Hochschule Zürich, Zürich (CH)

(72) Inventors: Nils Hasler, Saarbrücken (DE); Carsten Stoll, Saarbrücken (DE); Christian Theobalt, Saarbrücken (DE); Juergen Gall, Bornheim (DE); Hans-Peter Seidel, St. Ingbert (DE)

(73) Assignee: MAX-PLANCK GESELLSCHAFT SUR FÖRDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 14/081,310

(22) Filed: Nov. 15, 2013

(65) Prior Publication Data

US 2014/0072175 A1 Mar. 13, 2014

Related U.S. Application Data

(63) Continuation of application No. PCT/EP2012/055650, filed on Mar. 29, 2012.

(60) Provisional application No. 61/486,380, filed on May 16, 2011.

(30) Foreign Application Priority Data

May 16, 2011 (EP) .................................... 11166259

(51) Int. Cl.
*G06K 9/00* (2006.01)
*G06T 7/20* (2017.01)
*G06T 17/00* (2006.01)

(52) U.S. Cl.
CPC ........ *G06K 9/00536* (2013.01); *G06T 7/2046* (2013.01); *G06T 7/2093* (2013.01); *G06T 17/00* (2013.01); *G06T 2207/10024* (2013.01)

(58) Field of Classification Search
CPC .................................................. G06K 9/00
USPC .................................................. 382/103
See application file for complete search history.

(56) References Cited

U.S. PATENT DOCUMENTS

2010/0111370 A1* 5/2010 Black ................ G06K 9/00369 382/111
2012/0154579 A1* 6/2012 Hampapur ............ G06T 7/2006 348/143

OTHER PUBLICATIONS

Articulated Soft Objects for Multiview Shape and Motion Capture. Ralf Plankers and Pascal Fua. Sep. 2003.*
Model-Based Multiple View Reconstruction of People. Jonathan Starck and Adrian Hilton. 2003.*
Pfinder: Real-Time Tracking of the Human Body. Christopher Richard Wren, Ali Azarbayejani, Trevor Darrell, and Alex Paul Pentland. Jul. 1997.*

(Continued)

*Primary Examiner* — Vu Le
*Assistant Examiner* — Delomia L Gilliard
(74) *Attorney, Agent, or Firm* — McAndrews, Held & Malloy, Ltd.

(57) ABSTRACT

The present technology relates to a computer-implemented method for tracking an object in a sequence of multi-view input video images comprising the steps of acquiring a model of the object, tracking the object in the multi-view input video image sequence, and using the model.

23 Claims, 6 Drawing Sheets
(6 of 6 Drawing Sheet(s) Filed in Color)

(56) References Cited

OTHER PUBLICATIONS

Inferring 3D Structure with a Statistical Image-Based Shape Model. Kristen Grauman, Gregory Shakhnarovich, Trevor Darrell. 2003.*
International Search Report, PCT EP2012 055650, mailed Jun. 19, 2012.
Ralf Plankers and Pascal Fua, IEEE Transactions on Pattern Analysis and Machine Intelligence, vol. 25, No. 9, Sep. 2003, Published by the IEEE Computer Society, Copyright 2003 IEEE, (pp. 1182-1187), 6 pages.
Jonathan Starck and Adrian Hilton, Model-Based Multiple View Reconstruction of People,Proceedings of the Ninth IEEE International Conference on Computer Vision (ICCV03), Copyright 2003 IEEE, 8 pages.
Nils Hasler, Bodo Rosenhahn, Thorsten Thormahlen, Michael Wand, Juergen Gall, and Hans-Peter Seidel, Markerless Motion Capture with Unsynchronized Moving Cameras, Copyright 2009 IEEE (pp. 224-231), 8 pages.
D. M. Gavrila and L. S. Davis, 3-D model-based tracking of humans in action: a multi-view approach, Publication date: Jun. 18, 1996, Copyright 1996 IEEE (pp. 73-80), 8 pages.
Thomas B. Moeslund, Adrian Hilton, and Volker Kruger, 3-D model-based tracking of humans in action: a multi-view approach, Computer Vision and Image Understanding 104 (2006) 90-126, Copyright 2006 Elsevier Inc. (pp. 90-126), 37 pages.
Nebojsa Jojic, Matthew Tork and Thomas S. Huang, Tracking Self-Occhiding Articulated Objects in Dense Disparity Maps, Copyright 1999 IEEE, (pp. 123-130), 8 pages.
International Search Report, PCT EP2012 055650, mailed Jun. 19, 2012, (4 pages).
Satoshi Yonemoto, Daisaku Arita and Rin-Ichiro Taniguchi, Real-time Human Motion Analysis and IK-based Human Figure Control, Division of Intelligent Systems, Kyushu University, Japan, Copyright 2000 IEEE, (pp. 149-154), 6 pages.
Holger Wendland, Piecewise polynomial, positive definite and compactly supported radial functions of minimal degree, Advances in Computational Mathematics 4 (1995), (pp. 389-396), Copyright J.C. Baltzer AG, Science Publishers, 8 pages.
Christopher Richard Wren, Ali Azarbayejani, Trevor Darrell, and Alex Paul Pentland, Pfinder: Real-Time Tracking of the Human Body, IEEE Transactions on Pattern Analysis and Machine Intelligence, vol. 19, No. 7, Jul. 1997, Copyright 1997 IEEE (pp. 780-785), 6 pages.
Yebin Liu, Carsten Stoll, Juergen Gall, Hans-Peter Seidel, and Christian Theobalt, Markerless Motion Capture of Interacting Characters Using Multi-view Image Segmentation, 8 pages.

* cited by examiner

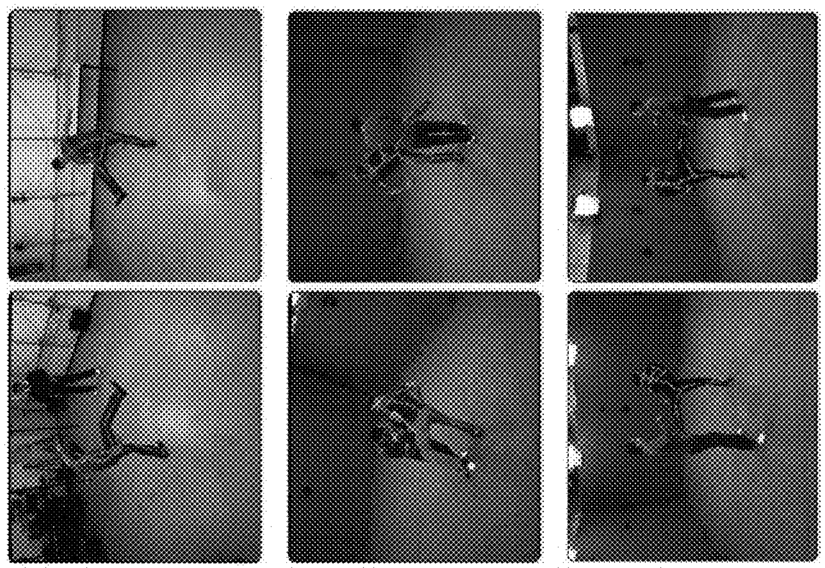
FIGURE 6
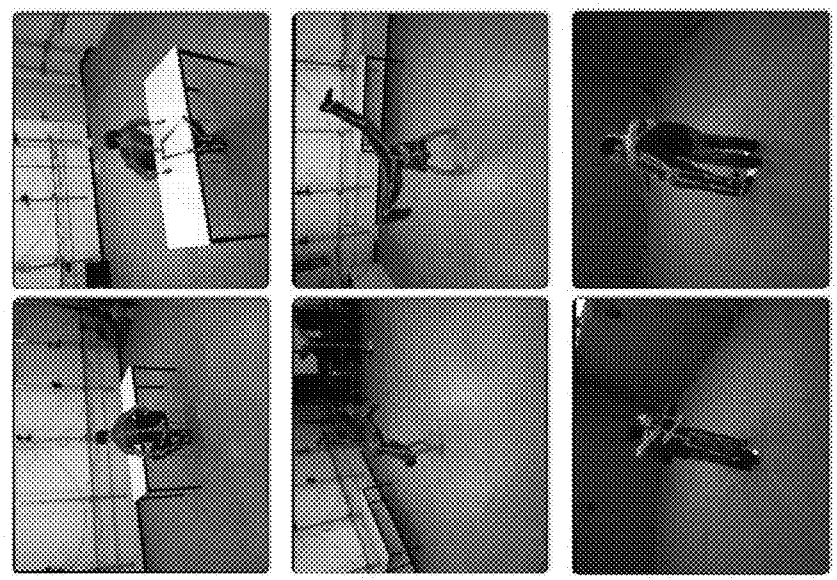

FAST ARTICULATED MOTION TRACKING

RELATED APPLICATIONS

This application is a continuation of, and claims priority to, International Application No. PCT/EP2012/055650 (International Publication Number WO 2012/156141), entitled "Fast Articulated Motion Tracking," and having an International filing date of Mar. 29, 2012. International Application No. PCT/EP2012/055650 claims priority benefits from European Patent Application No. 11166259.9, filed May 16, 2011, and U.S. Provisional Patent Application No. 61/486,380, filed May 16, 2011. International Application No. PCT/EP2012/055650, European Patent Application No. 111166259.9, and United States Provisional Patent Application No. 61/486,380 are hereby incorporated by reference herein in their entireties.

BACKGROUND

The present invention relates to fast articulated motion tracking.

One of the fundamental problems in computer vision is estimating the 3D motion of humans. Motion capture is an essential part in a wide range of modern industries, ranging from sport science, over biomechanics to animation for games and movies. The state-of-the-art in industrial applications is still marker-based optical capture systems, which enable accurate capture at the cost of requiring a complex setup of cameras and markers. Marker-less methods that are able to track the motion of characters without interfering with the scene geometry, rely on pose detection based on some image features. These approaches, however, assume that the poses have been previously observed during training.

Most related to the present invention is a real-time tracking system called Pfinder proposed by Wren et al. [C. Wren, A. Azarbayejani, T. Darrell, and A. Pentland. Pfinder: Real-time tracking of the human body. TPAMI, 19:780-785, 1997]. It models the human by 2D Gaussians in the image domain and represents the appearance of each blob by an uncorrelated Gaussian in the color space. The background is modeled by Gaussians in the color space for each image pixel. Pose estimation is finally formulated as 2D blob detection, i.e., each image pixel is assigned to the background or to one of the human blobs. The final 2D pose is obtained by iterative morphological growing operations and 2D Markov priors. The approach has been extended to the multi-view case in [S. Yonemoto, D. Arita, and R. Taniguchi. Real-time human motion analysis and ik-based human figure control. In Workshop on Human Motion, pages 149-154, 2000] where the blobs are detected in each image and the 3D position of the blobs is then reconstructed using inverse kinematics.

Other approaches to Human pose estimation without silhouette information combine segmentation with a shape prior and pose estimation. Graph-cut segmentation has been used as well as level set segmentation together with motion features or an analysis-by-synthesis approach. Handheld video cameras and a structure-from-motion approach are also used to calibrate the moving cameras. While these approaches iterate over segmentation and pose estimation, the energy functional commonly used for level-set segmentation can be directly integrated in the pose estimation scheme to speed-up the computation. The approach, however, does not achieve real-time performance and requires 15 seconds per frame for a multi-view sequence recorded with 4 cameras at resolution of 656×490 pixels.

Implicit surfaces have been used for 3D surface reconstruction. More particularly, a human model comprising a skeleton, implicit surfaces to simulate muscles and fat tissue, and a polygonal surface for the skin have been used for multi-view shape reconstruction from dynamic 3D point clouds and silhouette data. The implicit surfaces are modeled by Gaussians. Since the estimation of the shape and pose parameters is performed by several processes, the whole approach is very time consuming and not suitable for real-time application. To increase the reliability, motion priors can be used to improve model fitting. An implicit surface model of a human has been matched to 3D points with known normals.

It is therefore an object of the invention, to provide a method for acquiring a model and for tracking the pose of an actor in a digital video that is fast and efficient.

SUMMARY

This object is achieved by the methods and a device according to the independent claims. Advantageous embodiments are defined in the dependent claims.

According to the invention, a human model may be represented by a set of spatial Gaussians instead of making use of an explicit surface modeled by geometric primitives or a detailed triangle mesh. To this end, a person-specific model may be created from a sparse set of images. The model may comprise a kinematic skeleton that defines the degrees of freedom (DoF) of the human model and a statistical model that represents the shape and appearance of the human. In order to achieve real-time performance for pose estimation from multiple views, Sums of 3D Gaussians (SoG) may be used for the statistical model. Furthermore, the image may also be represented as a sum of spatial 2D Gaussians that cover image blobs that are consistent in color. Based on the representation of the model and the images as Sums of Gaussians, the invention introduces a novel formulation of the model-to-image similarity, whose analytical solution may be solved very efficiently with a gradient ascent algorithm.

More particularly, it allows a nearly real-time approach that does not rely on extracted silhouettes or training data.

Also, the inventive approach does not rely on a statistical background model to detect 2D blobs in the image, but uses 3D spatial Gaussians for the human model and 2D spatial Gaussians for the images to introduce an objective function for the model-to-image similarity that can be very efficiently maximized.

Finally, the approach does not rely on 3D data clouds or silhouette data for tracking, but models the similarity between the model and the unsegmented image data directly.

In some embodiments, the present technology provides a computer-implemented method for tracking an object in a sequence of multi-view input video images. The method can comprise the steps of acquiring a model of the object, and tracking the object in the multi-view input video image sequence, using the model.

Some embodiments present a system for tracking an object comprising a range of multi-view video cameras, a memory for storing a model of the object, and a processor for tracking the object based on the model.

In certain aspects, the present technology provides a computer-implemented method for acquiring a model of an object. The method can comprise the steps of acquiring a plurality of images of example poses of the object, estimating the model based on the acquired images, and storing the model in a computer-readable medium. The present technology also provides a computer-readable medium comprising a model, wherein the model is acquired by performing the aforementioned method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 shows tracking results of a method according to an embodiment of the invention as skeleton overlay over 12 input images from different camera views.

DETAILED DESCRIPTION

Figure 1:
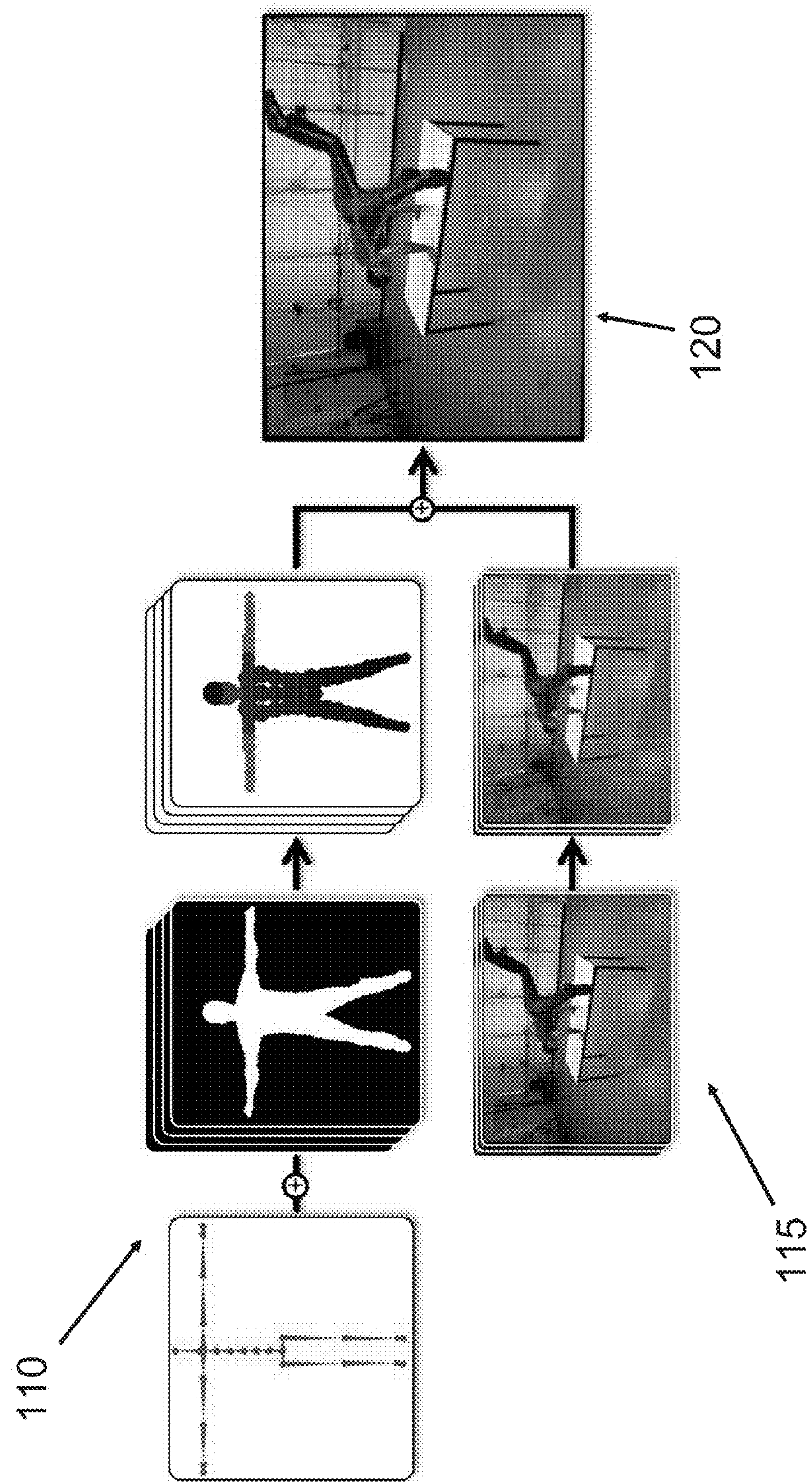
FIG. 1 shows an overview of a method according to an embodiment of the invention.

FIG. 1 shows an overview of a method according to an embodiment of the invention.

In a pre-processing step 110, a low number of manually segmented multi-view images showing example poses may be used to estimate an actor specific body model. The human body model comprises a kinematic skeleton and an attached body approximation.

The acquired model may then be used for tracking the articulated motion of the actor from multi-view input videos. More particularly, the performance of an actor may be captured with $n_{cam}$ synchronized and calibrated video cameras. Each input image acquired in step 115 may be converted into a body model representation in step 120.

Tracking may start with the estimated pose of the model in the previous frame, and may optimize the parameters such that the overlap similarity between the model and image SoG at the current frame is essentially maximized.

Figure 2:
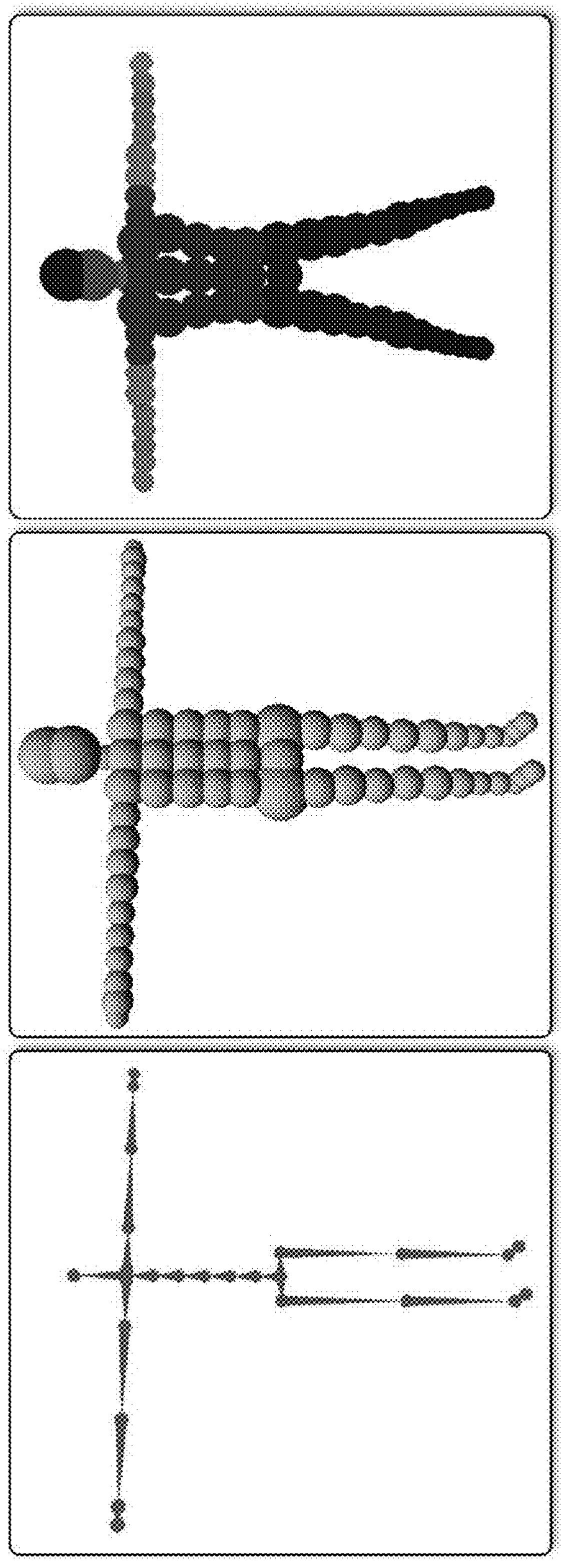
FIG. 2 shows, from left to right, a default skeleton, a default body model and an actor-specific model according to an embodiment of the invention.

FIG. 2 shows, from left to right, a kinematic skeleton model, a default body model and an actor-specific model according to an embodiment of the invention.

The kinematic skeleton model according to the present embodiment of the invention comprises 58 joints, modeling a detailed spine and clavicles. Each joint may be defined by an offset to its parent joint and a rotation represented in axis-angle form. It may also feature an allowable joint limit range $l_l$ to $l_h$. The model comprises a total of 61 parameters $\Lambda$, 58 rotational and an additional 3 translational. The kinematic skeleton model further comprises a separate degree of freedom (DoF) hierarchy, having nDoF pose parameters $\Theta$. In the present embodiment of the invention, a DoF hierarchy comprising $n_{DoF}$=43 pose parameters was used.

A relationship between $\Theta$ and $\Lambda$ may be modeled as a linear mapping given by an $61x_{nDoF}$ matrix M:

$$\Lambda = M\Theta \quad (1)$$

where each entry of M defines the influence weight the parameters of $\Theta$ have on the joint angles $\Lambda$. This construction allows the kinematic skeleton model to reproduce a natural deformation of the spine, as a single DoF can model smooth bending. It also allows straight-forward creation of several different levels of detail without having to edit the kinematic joint hierarchy itself.

According to the invention, the default human model combines the kinematic skeleton model with an attached approximation of the spatial extent of the human body model.

More particularly, the approximation may be represented as a sum of un-normalized Gaussians (SoG).

A single Gaussian B has the form:

$$\mathcal{B}(x) = \exp\left(-\frac{\|x-\mu\|^2}{2\sigma^2}\right) \quad (2)$$

where $\sigma^2$ is the variance, $\mu \in \Re^1$ the mean and d=3 for the human model. The Gaussians model only spatial statistics but not any appearance information like color. In order to achieve real-time performance, one need not model the full covariance matrix.

To cover the full 3D model, several spatial Gaussians may be combined into a Sum of Gaussians K:

$$\mathcal{K}(x) = \sum_{i=1}^{n} \mathcal{B}_i(x). \quad (3)$$

For the human body model, Eq. (3) describes the spatial extent of the human model. In contrast to explicit surfaces, the present model has infinite spatial support, but the influence decreases with the spatial distance to the mean.

An additional color model $C=[c_i]_i$ may be stored for each sum of Gaussians K, where $c_i$ is the color associated with the respective Gaussian $B_i$.

The default human body model may comprise 63 Gaussians and 58 joints. Each Gaussian is attached to or associated with a single parent joint of the skeleton, resulting in a default body model $K_m$ that is parameterized by the pose parameters $\Theta$ of the kinematic skeleton.

This model may be adapted to generate an actor specific body model that roughly represents the shape and color statistics for each person or actor to be tracked.

In order to obtain the pose parameters $\Theta$ of the human body model from a given input image, they may be selected such that a two-dimensional projection of the body model becomes essentially equal to a representation of the input image, according to a chosen norm.

Figure 3:
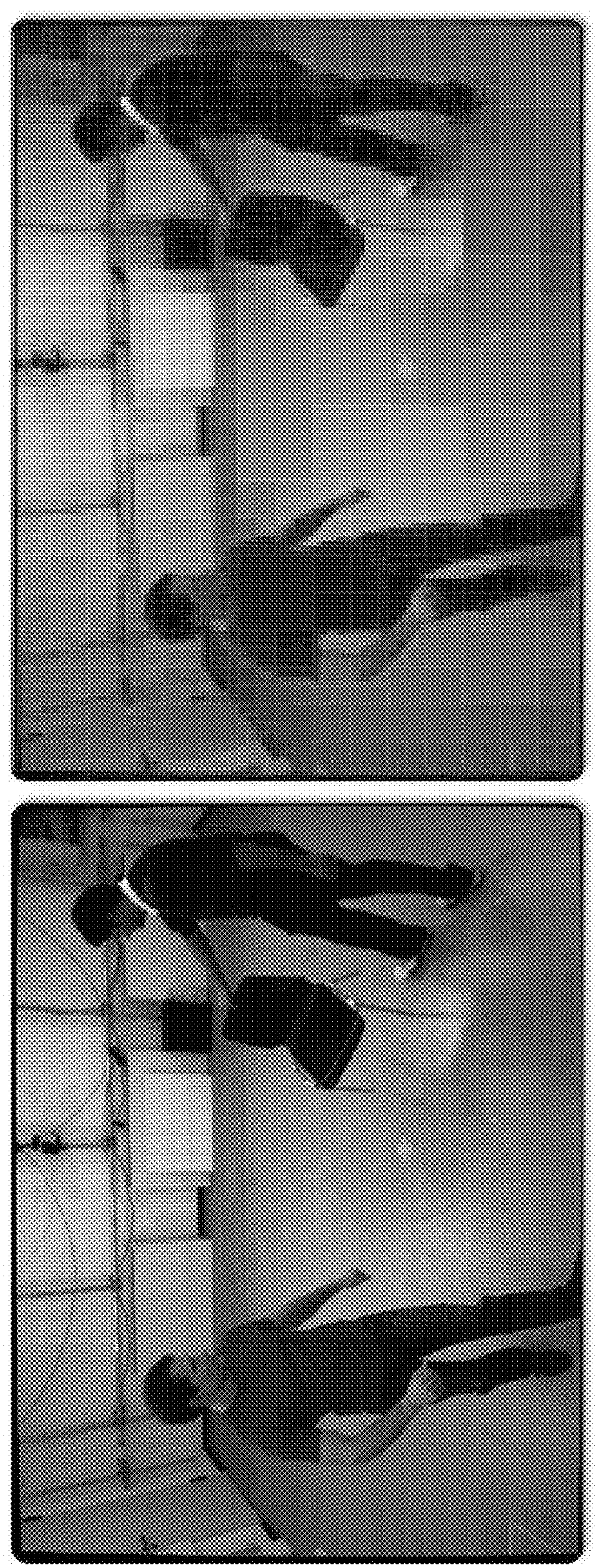
FIG. 3 is a schematic diagram illustrating self-occlusion handling according to an embodiment of the invention.

The input image may be represented by a sum of Gaussians. Both the image domain $\Omega \in \Re^2$ and the 3D human body model may be represented as Sums of un-normalized Gaussians (SoG). In the image domain, Eq. (3) describes the spatial extend of super-pixels that cluster pixels with similar colors as shown in FIG. 3. An additional color model $C=\{c_i\}_i$ is stored for each SoG K, where $c_i$ is the color associated with the respective Gaussian $B_i$. 2D-Gaussians.

In order to find an approximation $K_1$ that represents consistent pixel regions in a given image I, a single Gaussian $B_i$ may be created for each image pixel $p_i$ and one may assign to each Gaussian the color value $c_i \in \mathfrak{R}^3$ of the pixel.

In order to avoid an excessive amount of elements and the associated performance penalty, image pixels having similar color may alternatively be clustered into larger regions. The clustering step may use a quad-tree structure for efficiency. Each of the resulting regions may then be approximated using a single Gaussian $B_i$.

FIG. 3 shows an input image and a quad-tree structure with average colors used to generate an approximation of the input image by Sums of Gaussians.

For clustering, a threshold $\epsilon_{col}$ may be used to determine which pixels to cluster together (typically set to 0:15). If the standard deviation of colors on a quad-tree node is larger than $\epsilon_{col}$, the node may be subdivided into four sub-nodes, up to a maximum quad-tree depth of typically 8. Each quadratic cluster is then represented by a Gaussian $B_i$ where $\mu$ is the center of the cluster and $\sigma^2$ is set to be the square of half the side-length of the node. Furthermore, the average color $c_i$ of the cluster may be assigned to the Gaussian.

For comparing a 3D body model $K_m$ with a 2D image model $K_I$, one may define a projection operator $\Psi$, which projects a given Gaussian $\tilde{B}_i: \mathfrak{R} \mapsto \mathfrak{R}$ of the model to a Gaussian $B_i: \mathfrak{R}^2 \rightarrow \mathfrak{R}$. Given a camera $C_1$ with respective 3×4 camera projection matrix $P_1$ and focal length $f_1$, $B=\psi(\tilde{B})$ may be defined as the following operations:

$$\mu = \begin{pmatrix} [\tilde{\mu}^p]x / [\tilde{\mu}^p]_z \\ [\tilde{\mu}^p]_y / [\tilde{\mu}^p]_z \end{pmatrix} \quad (4)$$

$$s = \tilde{s} f_l / [\tilde{\mu}^p]_z$$

with $\tilde{\mu}^p = P_l \tilde{\mu}$ and $[\tilde{\mu}^p]_{x;y;z}$ being the respective coordinates of the transformed Gaussian mean.

Eq. (4) is only an approximation of the true projection that may be used for computational efficiency. In general, the perspective projection of a sphere is an ellipsoid rather than a circle. However, the error introduced by this approximation proved to be negligible.

According to the invention, a similarity between two given two-dimensional models $K_a: \mathfrak{R}^2 \rightarrow \mathfrak{R}$ and $K_b: \mathfrak{R}^2 \mapsto \mathfrak{R}$ and the associated color models $C_a$ and $C_b$, where $C=\{c_i\}_i$ contains the color values assigned to each Gaussian, may be defined as the integral of the product of $K_a$ and $K_b$ and a similarity measure between the color models, $d(c_i; c_j)$:

$$E(\mathcal{K}_a, \mathcal{K}_b, C_a, C_b) = \int_{\Omega} \sum_{i \in \mathcal{K}_a} \sum_{j \in \mathcal{K}_b} d(c_i, c_j) \mathcal{B}_i(x) \mathcal{B}_j(x)\, dx = \sum_{i \in \mathcal{K}_a} \sum_{j \in \mathcal{K}_b} E_{ij}, \quad (5)$$

where $$E_{ij} = d(c_i, c_j) \int_{\Omega} \mathcal{B}_i(x) \mathcal{B}_j(x)\, dx = d(c_i, c_j) 2\pi \frac{\sigma_i^2 \sigma_j^2}{\sigma_i^2 + \sigma_j^2} \exp\left( -\frac{\|\mu_i - \mu_j\|^2}{\sigma_i^2 + \sigma_j^2} \right) \quad (6)$$

The similarity $d(c_i; c_j)$ may be modeled by $$d(c_i, c_j) = \begin{cases} 0 & \text{if } \|c_i - c_j\| \geq \epsilon_{sim}, \\ \varphi 3, 1\left( \frac{\|c_i - c_j\|}{\epsilon_{sim}} \right) & \text{if } \|c_i - c_j\| < \epsilon_{sim}, \end{cases} \quad (7)$$

with $\phi_{3;1}(x)$ being the C2 smooth Wendland radial basis function with $\phi_{3;1}(0)=1$ and $\phi_{3;1}(1)=0$ [H. Wendland. Piecewise polynomial, positive definite and compactly supported radial functions of minimal degree. In: Adv. in Comput. Math., pages 389-396, 1995.]. This functional results in a smooth similarity measure that allows for a certain degree of variation in color matching and is guaranteed to be 0 if the difference between the colors is larger than $\epsilon_{sim}$, which was typically chosen to be 0:15. This particular similarity measure is one-sided, i.e., it only measures the regions that are similar and does not consider or penalize regions that are dissimilar.

When considering the similarity between a projected two-dimensional human body model $\Psi(K_m)$ and an image model $K_I$, the special properties of the projection operation have to be taken into account. The projection function above ignores possible self-occlusions that may occur when projecting the 3D model onto the 2D image plane. Several Gaussians may be projected onto overlapping 2D positions and thereby contribute several times to the energy function.

Figure 4:
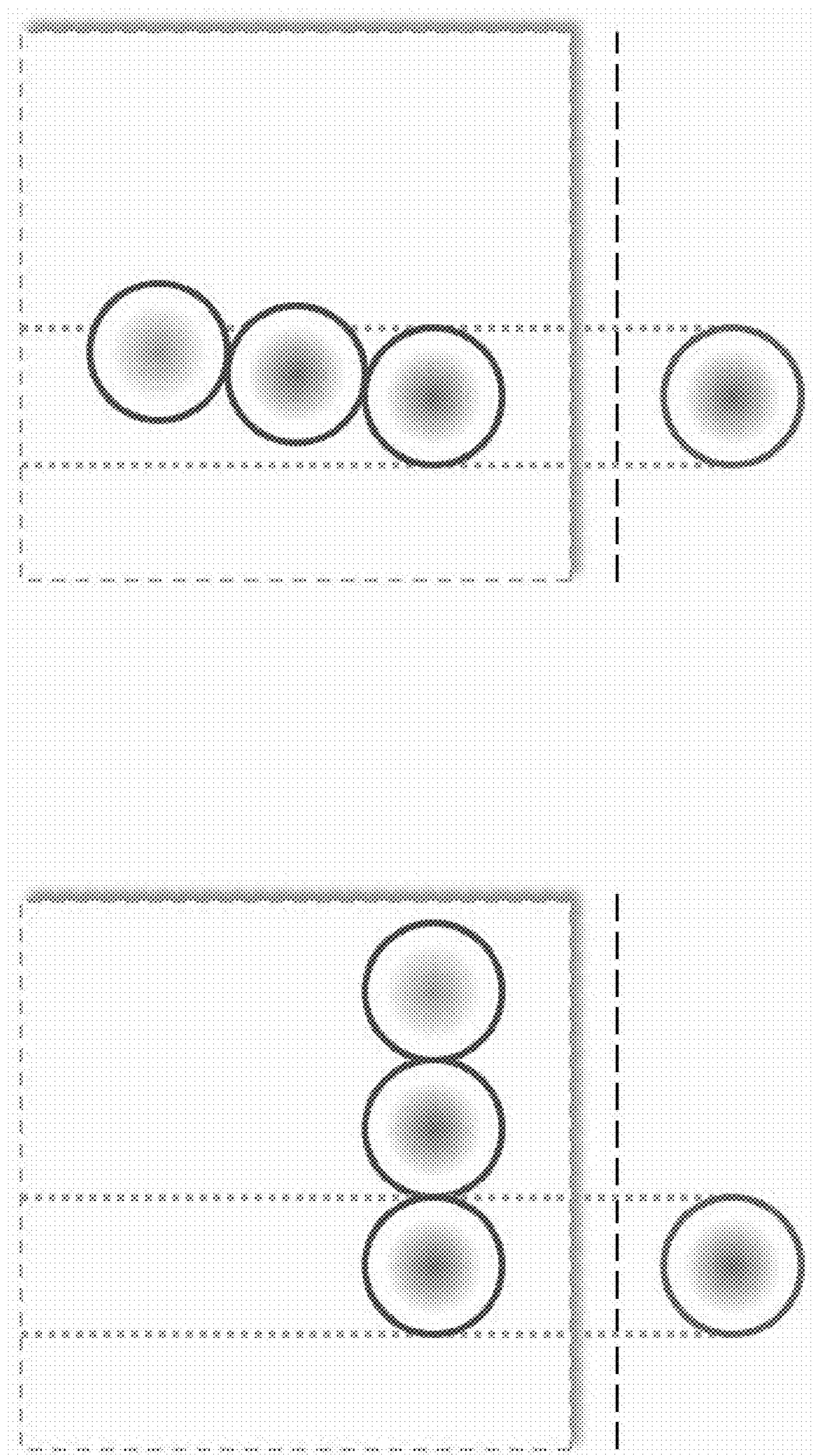
FIG. 4 shows an example of SoG image approximation according to an embodiment of the invention. Left: Input image. Right: Quad-tree structure with average colors used to generate the SoG. Each square is represented by a single Gaussian.

FIG. 4 compares a projection with no occlusions (left) with an occlusion situation (right). A top view of the 3D model is shown in the upper row while the lower row shows a view of the 2D model.

Without occlusions, Eq. (5) calculates a correct overlap of a single element. In this example, the color (blue) and the shape are identical, yielding the similarity $E_{ii}$.

If several 3D model Gaussians project to the same screen space coordinate, their contribution is cumulative, yielding a similarity larger than $E_{ii}$, even though two of the model Gaussians should be occluded.

According to the invention, this issue may be resolved implicitly by modifying Eq. (5) to limit the energy that a single image Gaussian can contribute to the total energy of the model:

$$E(\mathcal{K}_I, \Psi(\mathcal{K}_m), C_I, C_m) = \sum_{i \in \mathcal{K}_I} \min\left( \left( \sum_{j \in \Psi(\mathcal{K}_m)} E_{ij} \right), E_{ii} \right) \quad (8)$$

with $E_{ii} = \pi\sigma_i^2$ being the overlap of an image Gaussian with itself, defining the maximal possible energy it can contribute.

Eq. (8) limits the contribution of a single 2D image Gaussians, yielding the same similarity $E_{ii}$ for both cases.

If an image Gaussian and a projected 3D Gaussian coincide completely the overlap should be maximal. When projecting a second 3D model Gaussian to a nearby location, it cannot contribute more to the already perfect overlap. While this only partially approximates the effects of occlusion, the inventors found that it is sufficient to resolve most ambiguities introduced by occlusions, while analytic derivatives of the similarity function may still be calculated.

In order to estimate the pose-parameters $\Theta$ of the kinematic skeleton model from a set of $n_{cam}$ input images I, an energy function $E(\Theta)$ may be defined that evaluates how accurately the model described by the parameters $\Theta$ represents what may be seen in the images. The function is based on the proposed SoG models and can be used for es-timating the initial actor-specific body model as well as for tracking articulated motion.

The most important part of the energy function according to the invention is measuring the similarity of the body model in the pose defined by $\Theta$ with all input images. Given $n_{cam}$ cameras $C_1$ with respective SoG images $(K_1, C_1)$ and the 3D body $(K_m, C_m)$ parameterized by the pose vector $\Theta$, the similarity function E $(\Theta)$ may be defined as:

$$E(\Theta) = \frac{1}{n_{cam}} \sum_{l=1}^{n_{cam}} E(\mathcal{K}_l, \Psi_l(\mathcal{K}_m(\Theta)), C_l, C_m) \tag{9}$$

For the final energy function $E(\Theta)$, one may add a skeleton and motion-specific term:

$$\epsilon(\Theta)=E(\Theta)-\omega w_l E_{lim}(M\Theta)-w_a E_{acc}(\Theta) \tag{10}$$

$E_{lim}(\Lambda)$, with $\Lambda$=M $\Theta$ (1), is a soft constraint on the joint limits and $E_{acc}(\Theta)$ is a smoothness term that penalizes high acceleration in parameter space:

$$E_{lim}(\Lambda) = \sum_{l\in\Lambda} \begin{cases} 0 & \text{if } l_l^{(l)} \le \Lambda^{(l)} \le l_h^{(l)} \\ \|l_l^{(l)} - \Lambda^{(l)}\|^2 & \text{if } \Lambda^{(l)} < l_l^{(l)} \\ \|\Lambda^{(l)} - l_h^{(l)}\|^2 & \text{if } \Lambda^{(l)} > l_h^{(l)} \end{cases}$$

$$E_{acc}(\Theta_t) = \sum_{l\in\Theta_t} \left(\frac{1}{2}\left(\Theta_{t-2}^{(l)} + \Theta_t^{(l)}\right) - \Theta_{t-1}^{(l)}\right)^2$$

where $l_l$ and $l_h$ are lower and upper joint limits and $\Theta_{t-1}$ and $\Theta_{t-2}$ the poses of the previous frames.

The weights $w_l$ and $w_a$ influence the strength of the constraints and were set to $w_l=1$ and $w_a=0.05$ for the majority of the experiments. The impact of the constraints is evaluated in the experimental section.

Figure 5:
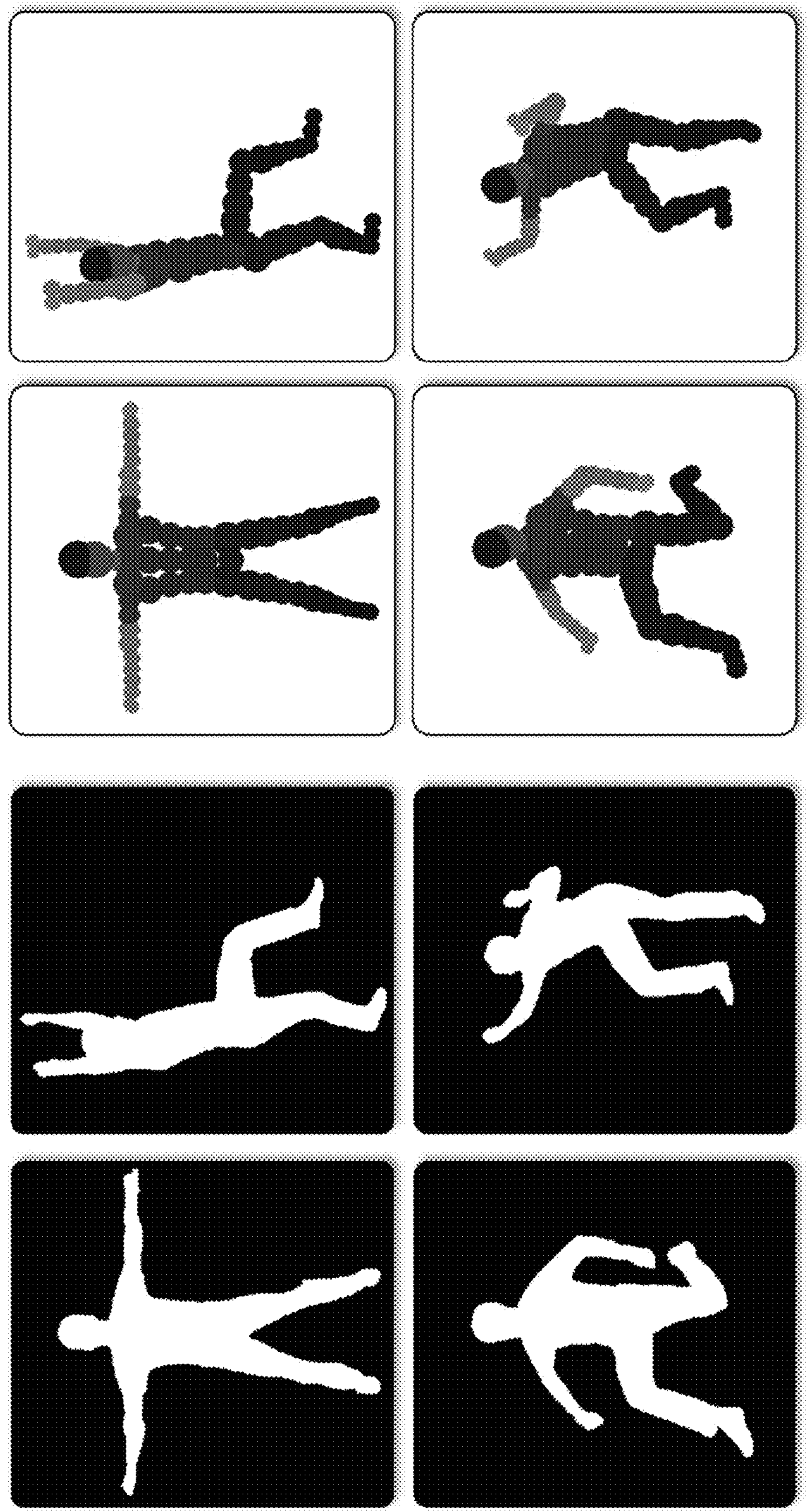
FIG. 5 shows an example of estimating an actor specific model from example pose images according to an embodiment of the invention. Left: Single segmented input image of the multi-view sets for each pose. Right: Resulting actor-specific body model after optimization and color estimation.

FIG. 5 shows different actor-specific models (right) derived from example pose images (left).

The default skeleton and body model may be used to estimate an actor specific model in a pre-processing step. A low number of temporally not subsequent, manually segmented multi-view images of example poses may be used as shown in FIG. 5. The four example poses are chosen to articulate a wide range of skeletal joints and therefore allow a relatively accurate estimation of the bone lengths of the skeleton. For each pose represented through a set of multi-view images, the pose parameters $\Theta$ are estimated. Additionally, a common set of shape parameters $\Theta_{shape}$ may be optimized that define bone lengths as well as the positions and variances of the Gaussian model for a total of 216 degrees of freedom.

The pose parameters $\Theta$ may roughly be initialized to correspond to the initial poses manually, and the similarity measure according to Eq. (9) based on the binary color values $c_i$ of the silhouette is maximized using a gradient-ascent approach explained below. After the joint optimization, the color images of each pose may be back-projected onto the 3D Gaussian models and the mean color $c_i$ for each Gaussian blob may be calculated taking occlusions into account.

Given an image sequence with m frames, one wants to estimate the pose parameters $\Theta^t$ for each time-step. In each time-step, the parameters $\Theta^t$ may be initialized by linear extrapolation of the motion in the previous time-steps, i.e., $\Theta^t_0=\Theta^{t-1}+\alpha(\Theta^{t-1}-\Theta^{t-2})$ with a set to 0.5 for all sequences. The parameters may now be optimized in order to maximize the energy (10). Because of the analytic formulation of similarity measure according to the invention, the analytic gradient $\nabla\epsilon(\Theta)$ may be calculated efficiently and used it in the optimization procedure.

In order to achieve fast performance, a conditioned gradient ascent may be used for optimizing the energy function. Simple gradient ascent tends to be slow when optimizing energy functions that consist of long narrow valleys in the energy landscape, as it tends to "zig-zag" between opposing walls. To prevent this, it is proposed to introduce a conditioning vector a, into the optimization $$\Theta_{i+1}{}^t=\Theta_i{}^t+\nabla\epsilon(\Theta_i{}^t)\circ\sigma_i \tag{11}$$

Here, $\circ$ is the component-wise Hadamard product of two vectors. The conditioner $\sigma_i$ is updated after every iteration, according to the following rule:

$$\sigma_{i+1}^{(l)} = \begin{cases} \sigma_i^{(l)}\mu+ & \text{if } \nabla\varepsilon^{(l)}(\Theta_i^t)\nabla\varepsilon^{(l)}(\Theta_{i-1}^t) > 0 \\ \sigma_i^{(l)}\mu^- & \text{if } \nabla\varepsilon^{(l)}(\Theta_i^t)\nabla\varepsilon^{(l)}(\Theta_{i-1}^t) \le 0 \end{cases} \tag{12}$$

Intuitively this conditioning will increase step-size in directions where the gradient sign is constant, and decrease it if the ascent is "zig-zagging". This proved to reduce the number of iterations necessary to reach a minimum drastically without having to resort to a more complex and more expensive second order optimizer. The inventors chose $\mu^+=1.2$ and $\mu^-=0.5$ for all experiments.

At least $n_{iter}$ iterations are performed for each time-step and the iterations are stopped when $\|\nabla\epsilon(\Theta_i{}^t)\circ\sigma_i\|<\epsilon$, where $n_{iter}=10$ and $\epsilon=0.002$ for most experiments.

The inventive method may be implemented using an array of synchronized and calibrated video cameras for obtaining multi-view videos of the actor's movements, and a standard computer. Since the similarity measure is continuous and differentiable, human pose estimation may be solved nearly in real-time even for many camera views. Computation time can further be reduced by parallelizing the evaluation of the double sum in equation 8 using graphics processing units (GPUs) or multi-processor systems.

FIG. 6 shows tracking results of a method according to an embodiment of the invention as skeleton overlay over 12 input images from different camera views.

Experiments of the inventors demonstrate that the inventive method, which does not assume an a-priori background estimate, works even in relatively uncontrolled settings. The motion may be tracked in some challenging situations including characters closely interacting with each other, and occlusion situations, such as a person sitting on a chair at a desk. A quantitative evaluation of the tracking performance demonstrates the reliability of the inventive approach on 17 sequences with over 12000 frames of multiview video. An unoptimized implementation may process a multi-view sequence recorded with 12 cameras at a resolution of 1296×972 pixels at 5-15 frames per second on a standard computer.

More particularly, the sequences were recorded with 12 cameras at a resolution of 1296×972 pixels at 45 frames per second. The quad-tree based image conversion according to the invention was set to a maximal depth of 8 nodes, effectively limiting the used resolution to 162×121 2D Gaussians. This resolution was found to be a suitable compromise between tracking accuracy in all scenes and processing speed. The HSV color space was used for calculating color similarity in all examples.

The sequences were recorded in a room without any special background and cover a wide range of different motions, including simple walking/running, multi-person interactions, fast acrobatic motions, and scenes having strong occlusions by objects in the scene, such as chairs and tables.

The remaining 5 sequences are taken from a different dataset [Y. Liu, C. Stoll, J. Gall, H.-P. Seidel, and C. Theobalt. Markerless motion capture of interacting characters using multiview image segmentation. In CVPR, 2011]. These sequences were recorded with a greenscreen background and show closely interacting characters fighting, dancing, and hugging. Since the inventive approach does not rely on background subtraction, no explicit use is made of the green-screen, but the approach still benefits from the distinct background color. The segmentation is handled implicitly.

To speed up the calculation of the energy function in Eq. (10), all image Gaussians $B_i$ may be removed whose color similarity is 0 to all of the body model Gaussians $B_j$, as they will not contribute to the energy function at all. Also, all elements that are outside of an enlarged bounding box of the pose in the last estimated frame may be removed.

The inventive method tracked all 17 sequences successfully at 5 to 15 frames per second depending on the scene complexity and the actor's motion speed. To evaluate the range of image resolution one may reliably deal with, and thus how robust the algorithm is to camera resolution, the images of several sequences were downsampled to 81×60 pixels and a single Gaussian was created for each pixel. In this experiment, no significant loss of the tracking quality would be observed.

A standard gradient ascent optimization was compared to the inventive conditioned gradient ascent on the cartwheel sequence shown in FIG. 6. The standard gradient ascent method required on average 65:38 iterations per frame to converge and failed to track the pose of the arms correctly in some frames. The inventive method on the other hand required only 34:56 iterations per frame and tracked the sequence successfully.

Finally, the accuracy of the inventive tracking approach was evaluated and compared to the method of Liu et al. [Y. Liu, C. Stoll, J. Gall, H.-P. Seidel, and C. Theobalt. Markerless motion capture of interacting characters using multiview image segmentation. In CVPR, 2011] on the ground truth multi-person data set kindly provided. The 38 marker positions of the marker system were associated with virtual markers on the inventive body model in the first frame by calculating the closest Gaussian and attaching the marker to its parent joint. Due to the black motion-capture suit and the fast motion, the sequence is difficult to track. The average distance between markers and their corresponding virtual markers on the tracked model of the invention is 44:93 mm with a standard deviation of 27:16 mm. While this is not as accurate as the result reported in [Liu et al.], namely 29:61 mm 25:50 mm, their tracking algorithm employs a laser scanned model and requires several minutes per frame for tracking, while the inventive method tracks the sequence at roughly 6 frames per second.

Without compensating for self-occlusions in the overlap term as in Eq. (8), the sequence fails to track correctly at all, leading to an error of 229:09 mm 252:04 mm. The impact of the weights $w_l$ and $w_a$ for the joint limits and the smoothness term in Eq. (10) is shown in Tables 1 and 2:

Table 1 shows the effect of the joint limit weight $w_l$ on tracking the ground truth dataset. Disregarding this term will lead to physically implausible joint motions, e.g., knees bending backwards.

TABLE 1

Effect of the joint limit weight $w_l$ on tracking the ground truth dataset.

| $w_l$ | 0.0 | 1.0 | 2.0 |
|---|---|---|---|
| error (mm) | 48.29 | 44.93 | 47.78 |

Table 2 shows the effect of the smoothness weight $w_a$ on tracking the ground truth dataset. Low smoothness leads to jitter in the motion, while high smoothness decreases tracking accuracy.

TABLE 2

Effect of the smoothness weight $w_a$ on tracking the ground truth dataset

| $w_a$ | 0.0 | 0.015 | 0.05 | 0.1 | 0.5 |
|---|---|---|---|---|---|
| error (mm) | 46.75 | 46.33 | 44.93 | 46.37 | 51.74 |

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" or "at least one" unless the context clearly dictates otherwise. Further, all references cited herein are incorporated in their entirety.

The invention claimed is:

1. A computer-implemented method for tracking an object in a sequence of multi-view input video images, the method comprising the steps of:

acquiring a model of the object, wherein the object includes a human body;

tracking the object in the multi-view input video image sequence, using the model, wherein the model includes a statistical model representing the shape of the object, wherein the model includes a kinematic model defining degrees of freedom of the human body, wherein pose parameters of the model of the human body are selected such that a two-dimensional projection of the model of the human body becomes similar to a representation of an input image according to a selected similarity measure, and wherein the tracking does not rely on 3D data clouds or silhouette data; and employing a conditioned gradient ascent algorithm to provide an analytical solution to enable real-time tracking.

2. The method of claim 1, wherein the statistical model comprises sums of spatially varying functions chosen such that an overlap or convolution of two or more blobs can be approximated efficiently.

3. The method of claim 2, wherein the statistical model comprises at least one of radial-symmetric functions, monotone functions, three dimensional Gaussians, hyperspheres, multiquadrics, superquadrics or polyharmonic splines.

4. The method of claim 1, wherein the model is acquired by scaling, translating or rotating a generic object model.

5. The method of claim 1, wherein multi-view input video cameras used for real-time tracking of the object are synchronized or gen-locked.

6. The method of claim 1, characterized in that the model comprises attributes characterizing the acquired object.

7. The method of claim 1, wherein the model is acquired online during tracking.

8. A system for tracking a human body, the system comprising:

a range of multi-view video cameras;

a memory for storing a model of the human body; and a processor for tracking the human body based on the model, wherein the model includes a statistical model representing the shape of the object, wherein the model includes a kinematic model defining degrees of freedom of the human body, wherein the processor is configured to select pose parameters of the model of the human body such that a two-dimensional projection of the model of the human body becomes similar to a representation of an input image according to a selected similarity measure, wherein the tracking does not rely on 3D data clouds or silhouette data, and wherein a conditioned gradient ascent algorithm is employed to provide an analytical solution to enable real-time tracking.

9. A computer-implemented method for acquiring a model of an object, the method comprising the steps of:

acquiring a plurality of images of example poses of the object, wherein the object includes a human body;

estimating the model based on the acquired images;

storing the model in a non-transitory computer-readable medium, wherein the model includes a statistical model representing the shape of the object, wherein the model includes a kinematic model defining degrees of freedom from the human body, wherein pose parameters of the model of the human body are selected such that a two-dimensional projection of the model of the human body becomes similar to a representation of an input image according to a selected similarity measure, and wherein tracking of the model does not rely on 3D data clouds or silhouette data; and employing a conditioned gradient ascent algorithm to provide an analytical solution to enable real-time tracking.

10. The method of claim 9, wherein the images are multi-view images.

11. The method of claim 10, wherein the multi-view images is used as example poses to articulate a range of skeletal joints and to allow an estimation of bone lengths of a skeleton.

12. The method of claim 10, further comprising the step of manually segmenting the multi-view images.

13. The method of claim 10, wherein the step of estimating the model further comprises:

estimating pose parameters for each example pose of the object; and estimating a set of shape parameters of the object.

14. The method of claim 13, wherein the pose parameters are estimated using a conditioned gradient ascent.

15. The method of claim 9, wherein the step of estimating the model further comprises estimating the model based on at least one of marker-based systems, magnetic systems, accelerometer based systems, and motion capture systems.

16. The method of claim 9, wherein the model is estimated based on an input of at least one of a depth camera, a 2.5D scanner, or a 3D scanner.

17. The method of claim 9, further comprising the step of manually constraining the model.

18. A non-transitory computer readable storage medium comprising a model, wherein the model is acquired by performing the steps of:

acquiring a plurality of images of example poses of an object, wherein the object includes a human body;

estimating the model based on the acquired images;

storing the model in the computer-readable medium, wherein the model includes a statistical model representing the shape of the object, wherein the model includes a kinematic model defining degrees of freedom of the human body, wherein pose parameters of the model of the human body are selected such that a two-dimensional projection of the model of the human body becomes similar to a representation of an input image according to a selected similarity measure, and wherein tracking of the model does not rely on 3D data clouds or silhouette data; and employing a conditioned gradient ascent algorithm to provide an analytical solution to enable real-time tracking.

19. The method of claim 1, wherein the statistical model does not rely on detecting 2D blobs in the image.

20. A computer-implemented method for tracking an object in a sequence of multi-view input video images, the method comprising the steps of:

acquiring a model of the object, wherein the object includes a human body;

tracking the object in the multi-view input video image sequence, using the model, wherein the model includes a statistical model representing the shape of the object, wherein the model includes a kinematic model defining degrees of freedom of the human body, wherein pose parameters of the model of the human body are selected such that a two-dimensional projection of the model of the human body becomes similar to a representation of an input image according to a selected similarity measure, and wherein the tracking does not rely on extracted silhouettes or training data; and employing a conditioned gradient ascent algorithm to provide an analytical solution to enable real-time tracking.

21. A system for tracking a human body, the system comprising: a range of multi-view video cameras;

a memory for storing a model of the human body; and a processor for tracking the human body based on the model, wherein the model includes a statistical model representing the shape of the object, wherein the model includes a kinematic model defining degrees of freedom of the human body, wherein the processor is configured to select pose parameters of the model of the human body such that a two-dimensional projection of the model of the human body becomes similar to a representation of an input image according to a selected similarity measure, wherein the tracking does not rely on extracted silhouettes or training data, wherein a conditioned gradient ascent algorithm is employed to provide an analytical solution to enable real-time tracking.

22. A computer-implemented method for acquiring a model of an object, the method comprising the steps of:

acquiring a plurality of images of example poses of the object, wherein the object includes a human body;

estimating the model based on the acquired images;

storing the model in a non-transitory computer-readable medium, wherein the model includes a statistical model representing the shape of the object, wherein the model includes a kinematic model defining degrees of freedom of the human body, wherein pose parameters of the model of the human body are selected such that a two-dimensional projection of the model of the human body becomes similar to a representation of an input image according to a selected similarity measure, and wherein tracking of the model does not rely on extracted silhouettes or training data; and employing a conditioned gradient ascent algorithm to provide an analytical solution to enable real-time tracking.

23. A non-transitory computer readable storage medium comprising a model, wherein the model is acquired by performing the steps of:

acquiring a plurality of images of example poses of the object, wherein the object includes a human body;

estimating the model based on the acquired images;

storing the model in the computer-readable medium, wherein the model includes a statistical model representing the shape of the object, wherein the model includes a kinematic model defining degrees of freedom of the human body, wherein pose parameters of the model of the human body are selected such that a two-dimensional projection of the model of the human body becomes similar to a representation of an input image according to a selected similarity measure, and wherein tracking of the model does not rely on extracted silhouettes or training data; and employing a conditioned gradient ascent algorithm to provide an analytical solution to enable real-time tracking.

* * * * *